Patented Mar. 15, 1949

2,464,290

UNITED STATES PATENT OFFICE 2,464,290

ALCOHOLYSIS OF POLYVINYL ESTERS

Griffith Bowen, Arlington, N. J., assignor to E. I. du Pont de Nemours & Company, Wilmington, Del., a corporation of Delaware No Drawing. Application March 19, 1947, Serial No. 735,793

8 Claims. (Cl. 260—90)

This invention relates to the preparation of polyvinyl alcohol and more particularly to the alcoholysis of polyvinyl esters in the presence of an alkali metal alkyl carbonate catalyst.

Methods heretofore employed for preparing polyvinyl alcohol, such as treating a polyvinyl ester in an aqueous or alcoholic medium in the presence of an acid or strong alkaline catalyst have proven unsatisfactory in that these conditions are conducive to the formation of colored substances which contaminate the polyvinyl alcohol produced by discoloration. It has been found that this discoloration persists even after any practical methods of purification. Furthermore, polyvinyl alcohol produced in the presence of strong alkaline catalysts has been found to be contaminated with a haze. Intensive washing has been proved inadequate for the removal of this haze from products made from the contaminated polyvinyl alcohol.

A substantial outlet for polyvinyl alcohol is for the production of polyvinyl acetals by condensation with aldehydes. An important and large use of these polyvinyl acetals is in laminating plasticized sheets of these resins with glass to form transparent safety glass. It is essential that polyvinyl acetal sheeting used for this purpose be characterized by toughness and superior optical properties and over a wide temperature range; that is, in addition to being strong and tough, such sheeting must be colorless and free from haze and foreign contamination.

An object of this invention is to provide an improved process for preparing polyvinyl alcohol of an exceptionally high degree of purity. A further object is to provide a process for preparing polyvinyl alcohol, said alcohol being substantially pure white and otherwise particularly adapted for use in the fabrication of articles requiring high strength and optical clarity.

A still further object of this invention is to provide an improved process for the manufacture of polyvinyl alcohol wherein a catalyst is used having an increased solubility in the reaction medium which gives rise to increased reaction rates and consequently makes the production of polyvinyl alcohol commercially more practical. The increased solubility of the catalyst eliminates and/or diminishes to a new minimum entrainment within the precipitating polyvinyl alcohol.

Other objects will be apparent from the description of the invention given hereinafter.

These objects are accomplished according to the present invention by heating a polyvinyl ester at 20° C.–70° C. in an anhydrous liquid aliphatic alcohol medium in the presence of an alkali metal alkyl carbonate catalyst, said catalyst being present in the concentration of 0.08%–0.7%, calculated as alkali metal, and based on the weight of said polyvinyl ester and alcohol.

The following examples, in which all parts are given by weight unless otherwise specified, illustrate specific embodiments of this invention:

Example I

A solution of sodium methyl carbonate was prepared by carbonating with carbon dioxide gas a solution comprising sodium methylate dissolved in anhydrous methyl alcohol until the solution was neutral to phenolphthalein indicator.

500 parts of this catalyst solution containing 12.8 parts of sodium methyl carbonate, and a solution of 100 parts polyvinyl acetate dissolved in 300 parts anhydrous methyl alcohol, were simultaneously added at a uniform rate over a period of 40 minutes to a reaction kettle containing 100 parts of methyl alcohol, said reaction vessel being provided with a means for agitation and a reflux condenser. The sodium methyl carbonate catalyst concentration being 0.3% by weight of methyl alcohol and polyvinyl acetate, and calculated as alkali metal. The reactants were agitated and maintained at 65° C. during this addition.

Agitation and heating were continued until polyvinyl alcohol precipitated from the reaction mass as pure white, uniform particles, and for an additional 30 minutes. The reaction mass was then cooled and the product isolated.

The product so prepared proved to be specially suitable for condensation with butyraldehyde in the preparation of polyvinyl butyral for use in safety glass interlayer. Polyvinyl butyral safety glass interlayer derived from this polyvinyl alcohol was characterized by exceptional clarity, freedom from color, and possessed high strength.

Example II

A catalyst solution was prepared by dissolving 1.12 parts of sodium methyl carbonate in 225 parts of anhydrous methyl alcohol. This solution was added to a reaction vessel provided with a means for agitation and a reflux condenser. Agitation was begun, the solution was heated to 55° C., and 25 parts of solid polyvinyl acetate were added to the catalyst solution at a uniform rate over a period of 45 minutes. The sodium methyl carbonate catalyst concentration being 0.10% by weight of methyl alcohol and polyvinyl acetate, and calculated as alkali metal. The reaction vessel was then sealed and the temperature increased to 68° C. Under these conditions a pressure of approximately 3 p. s. i. was generated. Polyvinyl alcohol in the form of fine white uniform particles precipitated from the reaction mass 187 minutes from inception of reaction. Agitation was continued and temperature of reaction maintained at 68° C. for an additional 30 minutes after which the product was cooled and separated.

The polyvinyl alcohol so produced was condensed with butyraldehyde in the presence of an acid catalyst to form a partial polyvinyl butyral which contained approximately 20% by weight unreacted polyvinyl alcohol. This polyvinyl butyral was compounded with dibutyl sebacate and formed into a sheet, which was laminated between two sheets of glass with heat and pressure. The resulting safety glass laminate was clear, free from color and when tested by standard procedures was shown to possess strength in substantial excess of that shown by safety glass laminates containing a polyvinyl butyral interlayer derived from conventionally prepared polyvinyl alcohol.

*Example III*

A heavy duty kneader mixer was charged with 300 parts anhydrous methyl alcohol and 14.5 parts sodium methyl carbonate and raised to a temperature of 50° C. Agitation was begun and 200 parts of solid polyvinyl acetate were added at a controlled uniform rate over a period of 20 minutes. The highly viscous mass that resulted was kneaded until polyvinyl alcohol precipitated, and the kneading was continued for an additional 30 minutes. 250 parts of methyl alcohol were then added and the reaction mass acidified to pH 6 with acetic acid, and agitation was continued for 5 minutes. The sodium methyl carbonate catalyst concentration being 0.68% by weight of methyl alcohol and polyvinyl acetate, and calculated as alkali metal. The product was then filtered, washed and dried. The isolated product was characterized by physical qualities comparable to the products of Example I and Example II.

*Example IV*

A solution of potassium ethyl carbonate was prepared by carbonating with gaseous carbon dioxide a solution comprising potassium ethylate dissolved in anhydrous ethyl alcohol, until the solution was neutral to phenol-pthalein.

100 parts of this catalyst solution containing 3.0 parts potassium ethyl carbonate were added to a reaction vessel provided with a means for agitation and a reflux condenser, and heated to 60° C. Agitation was begun and a solution comprising 100 parts polyvinyl acetate dissolved in 300 parts anhydrous ethyl alcohol, which had been heated to 60° C., was added at a uniform rate over a period of 30 minutes. The potassium ethyl carbonate catalyst concentration being 0.18% by weight of ethyl alcohol and polyvinyl acetate, and calculated as alkali metal. Agitation and heating were continued until polyvinyl alcohol precipitated as fine white uniform particles, and for an additional 30 minutes, following which the reaction mass was cooled and the product isolated. The product was pure white, free from color, and could be used in preparing haze-free polyvinyl butyral.

It will be understood that the above examples are merely illustrative, and that the instant invention broadly includes the process of preparing polyvinyl alcohol by heating a polyvinyl ester at 20° C.–70° C. in an anhydrous liquid aliphatic alcohol medium in the presence of an alkali metal alkyl carbonate catalyst, said catalyst being present in the concentration of 0.08%–0.7%, calculated as alkali metal, and based on weight of said polyvinyl ester and alcohol.

After the alcoholysis reaction is complete it has been found advantageous to acidify the reaction mass prior to isolation of product. Such treatment facilitates filtering and washing operations. In practice, addition of acetic acid until the reaction mass is just acid to phenolphthalein has been found to achieve these results.

Although this invention has been described with particular reference to the alcoholysis of polyvinyl acetate, it is equally applicable to the alcoholysis of other polymerized vinyl esters such as, for example, the propionate, formate, butyrate, lactate, benzoate and the like. Likewise the invention is applicable to the alcoholysis of copolymers of vinyl esters with another polymerizable compound, for example, ethylene/vinyl acetate copolymer, methyl methacrylate/vinyl acetate copolymer, vinyl chloride/vinyl acetate copolymer, and similar copolymers. The extent of alcoholysis may be controlled to obtain the partially or substantially completely alcoholized polyvinyl ester.

While it is conceivable that many widely varied alkali metal alkyl carbonates will be operable, in the practice of this invention it is generally preferred that the alkyl constituent be limited to those containing 5 or less carbon atoms. Of the alkali metals, potassium and sodium are preferred, and specifically the preferred catalyst for use in this invention will be sodium or potassium, methyl or ethyl carbonate. The catalysts of this invention may be prepared by any of several methods, the best of which is the direct carbonation of an anhydrous alcohol solution of the alkali metal alcoholate with dry carbon dioxide gas. Carbonation of alcoholic alkali hydroxide also yields the alkali metal alkyl carbonate. The alkali metal alkyl carbonates are soluble in the lower alcohols and normally will be dissolved in the alcohol in practice of this invention. The catalysts may be employed over a wide range of concentration under various conditions but it has been found more practical to maintain the concentration within a range of about 0.08%–0.7% weight percent of the polyvinyl ester and alcohol present calculated as the alkali metal. At concentrations below the lower limit reaction will occur but at such a diminished rate that the operation is not practical. At concentrations above this maximum no substantial increase in advantages is obtained.

Alkali metal alkyl carbonates may be used successfully in any of the various techniques currently being used in manufacture of polyvinyl alcohol or partially alcoholized polyvinyl esters. Thus, alkali metal alkyl carbonates are applicable in techniques such as the controlled addition of solid polyvinyl ester to the catalyzed alcohol reaction mass, the simultaneous, or controlled addition of a solution of the polyvinyl ester to a catalyzed alcohol reaction mass, or the simultaneous addition of a catalyzed alcohol and a solution of the polyvinyl ester to a reaction kettle.

In the preferred practice of this invention the following limits will be observed. These limits however are established for practical reasons and to act as a guide in practicing this invention.

Alcohol concentration based on weight alcohol plus weight polyvinyl ester will normally vary from 50 to 95%. Polyvinyl ester concentration on the same basis will normally vary from 5 to 50%. The addition time of solid polyvinyl ester or polyvinyl ester solution will vary from five to sixty minutes while the addition time of the catalyzed alcohol solution may vary from zero to sixty minutes. The temperature of alcoholysis according to this invention may vary from 20° C.–70° C., depending upon which alkali metal alkyl carbonate is used, and the catalyst concentration. Preferably this temperature will vary from 50° C. to 70° C.

While in most cases the reaction is run at atmospheric pressure under reflux, it is possible to run the reaction under slightly higher pressure and in certain cases application of such pressure improves particle size of the polyvinyl alcohol produced. Thus, the pressure of reaction may be varied from a minimum of atmospheric, to a maximum of about ten pounds per square inch gauge pressure. The cycle, or time required from reaction initiation to the point of polyvinyl alcohol precipitation from the reaction mass may vary from seventeen to two-hundred and fifty minutes, the average run requiring approximately one-hundred and ten minutes.

In carrying out this invention, it has been found that water exerts an inhibiting effect upon the alcoholysis reaction. Therefore anhydrous chemicals should be used in practice of this invention. It has been found however, that certain commercial grade anhydrous chemicals frequently contain relatively small amounts of water, usually less than 1%. The process of this invention may be carried out successfully in the presence of such small amounts of water. Therefore, the term anhydrous as used herein should be construed to cover conditions resulting from the use of commercial grade anhydrous reactants.

Polyvinyl alcohol, or partially alcoholized polyvinyl esters prepared according to this invention are pure white and are characterized by a uniform high quality. Polyvinyl acetal resins made from the product of this invention when formed into plasticized sheets and laminated between glass layers are free from color and haze contamination, and possess excellent toughness.

As many apparently widely different embodiments of this invention may be made without departing from the spirit and scope thereof, it is to be understood that the invention is not limited to the specific embodiments thereof except as defined in the appended claims.

I claim:

1. A process for the preparation of polyvinyl alcohol which comprises heating a polyvinyl ester in a substantially anhydrous aliphatic liquid alcoholic medium having therein an alkali metal alkyl carbonate catalyst, the alkyl constituent of which contains from 1 to 5 carbon atoms.

2. A process for the preparation of polyvinyl alcohol which comprises heating a polyvinyl ester at a temperature of 20° C. to 70° C. in a substantially anhydrous aliphatic liquid alcoholic medium having therein an alkali metal alkyl carbonate catalyst, the alkyl constituent of which contains from 1 to 5 carbon atoms, the amount of said catalyst present being 0.08% to 0.7% by weight of said ester and alcohol calculated as alkali metal.

3. A process for the preparation of polyvinyl alcohol which comprises heating a polyvinyl ester at a temperature of 20° C. to 70° C. in a substantially anhydrous aliphatic liquid alcoholic medium having therein a sodium methyl carbonate catalyst, the amount of said catalyst present being 0.08% to 0.7% by weight of said ester and alcohol calculated as alkali metal.

4. A process for the preparation of polyvinyl alcohol which comprises heating a polyvinyl ester at a temperature of 20° C. to 70° C. in a substantially anhydrous aliphatic liquid alcoholic medium having therein a sodium ethyl carbonate catalyst, the amount of said catalyst present being 0.08% to 0.7% by weight of said ester and alcohol calculated as alkali metal.

5. A process for the preparation of polyvinyl alcohol which comprises heating a polyvinyl ester at a temperature of 20° C. to 70° C. in a substantially anhydrous aliphatic liquid alcoholic medium having therein a potassium methyl carbonate catalyst, the amount of said catalyst present being 0.08% to 0.7% by weight of said ester and alcohol calculated as alkali metal.

6. A process for the preparation of polyvinyl alcohol which comprises heating a polyvinyl ester at a temperature of 20° C. to 70° C. in a substantially anhydrous aliphatic liquid alcoholic medium having therein a potassium ethyl carbonate catalyst, the amount of said catalyst present being 0.08% to 0.7% by weight of said ester and alcohol calculated as alkali metal.

7. A process for the preparation of polyvinyl alcohol which comprises heating polyvinyl acetate at a temperature of 65° C. in a substantially anhydrous methyl alcohol medium, said medium containing 0.3% by weight of said polyvinyl acetate and methyl alcohol and calculated as alkali metal, a sodium methyl carbonate catalyst.

8. A process for the preparation of polyvinyl alcohol which comprises heating polyvinyl acetate at a temperature of 60° C. in a substantially anhydrous ethyl alcohol medium, said medium containing 0.18% by weight of said polyvinyl acetate and ethyl alcohol calculated as alkali metal, a potassium ethyl carbonate catalyst.

GRIFFITH BOWEN.

No references cited.